Feb. 8, 1938.　　　　G. B. OLIVER　　　　2,107,493
LAP ROBE FOR MOTOR VEHICLES
Filed March 30, 1936　　　　2 Sheets-Sheet 1

Inventor
G. B. Oliver.

By Thos. H. Johnston
Attorney

Feb. 8, 1938.   G. B. OLIVER   2,107,493
LAP ROBE FOR MOTOR VEHICLES
Filed March 30, 1936   2 Sheets-Sheet 2
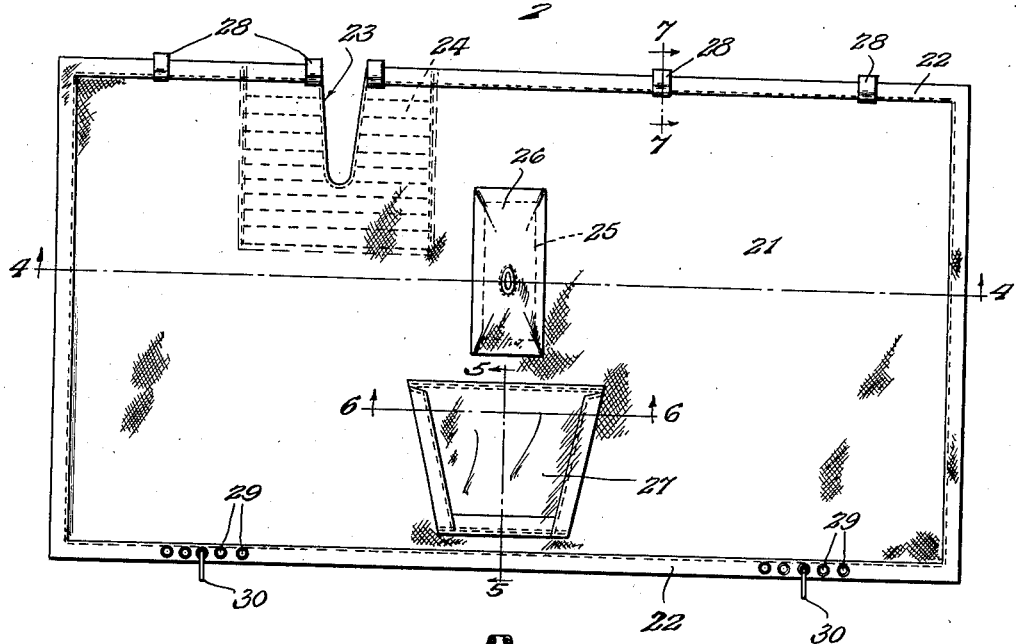

Patented Feb. 8, 1938

2,107,493

UNITED STATES PATENT OFFICE 2,107,493

LAP ROBE FOR MOTOR VEHICLES

Geffrod B. Oliver, Springfield, Mass., assignor to Nashua Manufacturing Company, Boston, Mass., a corporation of New Hampshire Application March 30, 1936, Serial No. 71,771

1 Claim. (Cl. 296—81)

This invention relates to an improved lap robe for motor vehicles and seeks, among other objects, to provide a device wherein the warm air liberated within the vehicle body by a heater mounted on the dash will be confined within the cowl chamber at the front of the vehicle to be distributed laterally within said chamber so that the feet and legs of both the driver and a passenger on the front seat of the vehicle will be warmed regardless of the lateral location of the heater near one side or the other of the vehicle.

The invention seeks, as a further object, to provide a device embodying a flexible apron attached to the instrument panel of the vehicle for confining the warm air within the cowl chamber and wherein said apron will provide a robe for the occupants of the front seat of the vehicle.

A further object of the invention is to provide an apron which may be readily attached to conventional motor vehicles, which may be hung up out of the way when not in use and wherein the apron will be provided with means to flexibly accommodate the gear shift lever of the vehicle so that the apron will in no way hamper the free operation of the vehicle.

And the invention seeks, as a still further object, to provide an apron which, if so desired, will be provided with one or more pockets for containing cigarettes or the like handy to the driver of the vehicle so that the apron will materially add to the convenience of the driver or passenger on the front seat of the vehicle.

Other and incidental objects of the invention will appear during the course of the following description and in the drawings which form a part of my application, Figure 1 is a view partly in elevation and partly in section showing my improved lap robe in connection with a conventional motor vehicle.

Figure 3 is a detail plan view of the apron.

Figure 4 is a longitudinal sectional view on the line 4—4 of Figure 3.

Figure 5 is a detail section on the line 5—5 of Figure 3, showing the pocket.

Figure 6 is a detail section on the line 6—6 of Figure 3.

Figure 7 is a detail section on the line 7—7 of Figure 3, showing one of the attaching clips of the apron.

Figure 8 is a detail section showing a modified form of clip.

Figure 9 is a detail elevation showing a suspension device which may, when so desired, be used for the apron.

Figure 2:
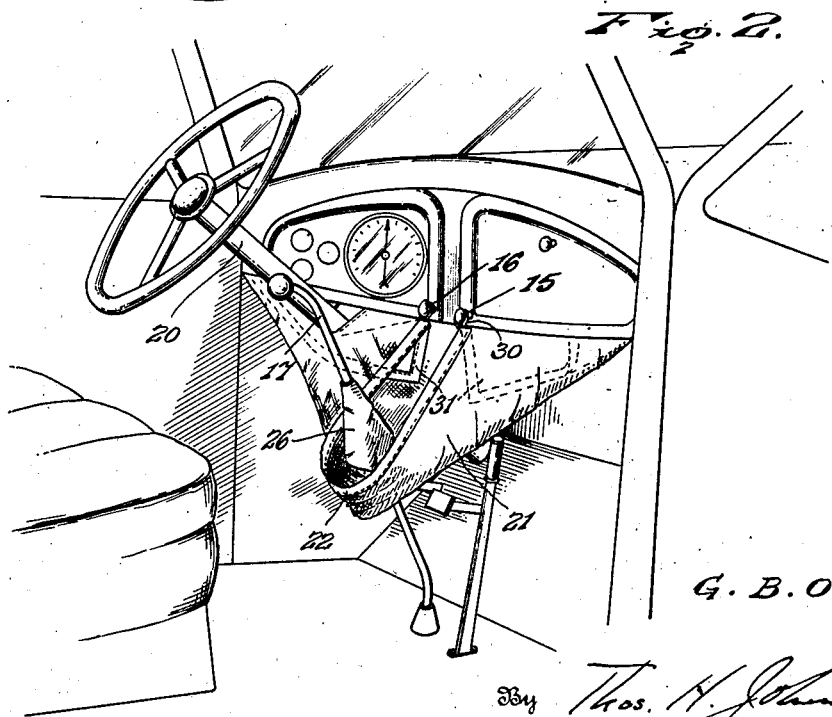
Figure 2 is a perspective view showing the manner in which the apron is suspended when not in use.

Referring now more particularly to the drawings, I have conventionally shown a closed motor vehicle having the usual cowl 10 and dash 11 defining a cowl chamber 12 at the front of the vehicle body. The instrument panel is indicated at 13, this panel being provided at its lower edge with the usual forwardly extending L-shaped flange 14, while, in Figure 2, are seen the usual choke and throttle knobs 15 and 16. The gear shift lever is indicated at 17.

Mounted on the dash 11 is a heater 18 to which lead pipes 19 connected with the cooling system of the vehicle motor so that a portion of the heated liquid in said system will flow through the heat exchange core of the heater. Associated with said core is the usual electric fan for setting up currents of air to flow through the core and thence rearwardly into the vehicle body for warming the occupants of the vehicle. The heater is conventionally illustrated and it is accordingly thought unnecessary to show the details thereof.

As is well known, the heater 18 is usually located adjacent one side or the other of the vehicle with the result that the particular occupant of the front seat out of line with the currents of air issuing from the heater is not warmed. Furthermore, the currents of heated air tend, of course, to rise immediately and flow upwardly around the instrument panel 13 whence the air currents tend to blow in the face of the driver, if the heater is mounted at the left, or in the face of the passenger on the front seat, if the heater is mounted at the right. This is not only annoying but also, due to the quick rise of the currents of air from the heater, the feet and legs of the driver and front seat passenger remain cold. The present invention therefore seeks to overcome these disadvantages. The usual steering post of the vehicle is indicated at 20.

In carrying the invention into effect, I employ an oblong apron body 21 which is preferably of wool, although, of course, other suitable fabric may be employed; and stitched about the edges of the body is an appropriate binding 22. Formed in the forward margin of the body near the adjacent left corner thereof is a V-shaped notch 23 and attached to the lower side of the body at said notch in a rectangular reinforcing patch 24 of suitable fabric. As shown in dotted lines in Figure 3, the patch is secured to the body 21 by closely spaced parallel lines of stitching extending longitudinally of the body as well as by lines of stitching extending adjacent the outer peripheral margin of the patch and adjacent the edges of the notch 23 so that the patch is thus firmly attached to the body to prevent ripping thereof or pulling of the body at the notch.

Formed in the body centrally thereof is an elongated opening or slot 25 extending transversely of the body and stitched to the body about the edges of said slot is an upstanding flexible tapered sleeve 26 which is preferably of the same material as the body. The large lower end of the sleeve is rectangular to conform to the contour of the slot 25 while the upper end of the sleeve is relatively small and is circular, the upper end of the sleeve being preferably provided with a reinforcing hem.

Stitched at its forward and rear margins to the upper side of the body 21 rearwardly of the sleeve 26 is a medially disposed pocket 27 which, as shown in Figure 6, is open at both ends thereof. This pocket, like the sleeve, is also of the same material as the body and is preferably tapered in width to facilitate insertion of the hand at either end of the pocket, the small longitudinal dimension of the pocket being disposed rearwardly.

Riveted or otherwise fixed to the body 21 at the forward margin thereof is a plurality of spaced resilient attaching clips 28. As shown in detail in Figure 3 of the drawings, the clips are substantially U-shaped and corresponding ends thereof are attached to the apron body therebeneath while the opposite corresponding free ends of said clips overhang the binding 22 at the upper side of the body. Preferably, one of the clips is arranged at each side of the mouth of the notch 23 close thereto while also, a clip is disposed near each end of the apron body.

Formed in the rear margin of the apron body 21 near each end thereof is a series of spaced openings 29 which extend through the binding 22 and are preferably equipped with suitable eyelets. Engageable through said openings selectively are split rings 30, the rings thus being adjustable longitudinally of the body for a purpose which will presently appear.

Figure 1:
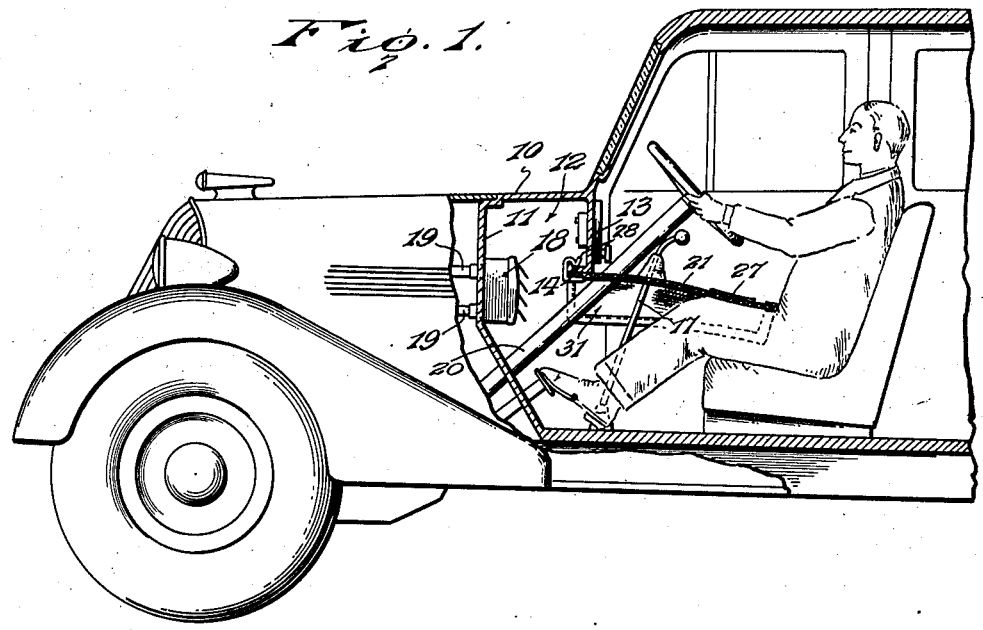

In Figures 1 and 2 of the drawings I have shown the apron applied. As will be observed, the notch 23 in the apron body is located to accommodate the steering post 20, thus permitting the clips 28 to be engaged over the flange 14 of the instrument panel 13, as best seen in Figure 1, for firmly connecting the apron at its forward margin with said panel. Thus, the apron may be readily applied when so desired and may be as easily removed and it is now to be noted that the sleeve 26 is located to receive the gear shift lever 17 which lever extends freely through the slot 25 of the apron body and through the sleeve, the small end of the sleeve fitting the lever rather closely. To insert the lever, the knob at the upper end thereof is removed, said knob being, as is usual, screwed on the lever.

Attention is now directed to the fact that the apron is of a width to extend over the laps of the occupants of the front seat of the vehicle, providing a robe, and is of a length greater than the width of the vehicle body. Consequently, as the outermost clips 28 are spaced from the ends of the apron body and are engaged with the flange 14 at the ends of the instrument panel 13, flaps 31 are formed by the end portions of the apron which flaps hang down at the sides of the vehicle body about the legs of the occupants of the front seat. Thus, as will now be clear, currents of heated air issuing from the heater 18 within the cowl chamber 12 of the vehicle will be retained by the apron within said chamber about the feet and legs of the occupants of the front seat of the vehicle for keeping the feet and legs warm. Furthermore, as the heated air currents cannot rise upwardly into the vehicle body immediately upon passing the instrument panel 13, a blast of hot air will be prevented by the apron from blowing in the face of either the driver of the vehicle or a passenger on the front seat, depending upon the lateral location of the heater, while the heated air currents will be caused to spread laterally within the chamber 12 for warming the legs and feet of both occupants of the front seat. The improved device will thus materially add to the comfort of the occupants of the vehicle and will, through the convenient location of the pocket 27 in which cigarettes or the like may be accessibly carried, also contribute to their convenience.

As the apron is not fastened at its rear margin, some of the warm air will, of course, escape into the rear portion of the vehicle body for heating the vehicle and it is now to be noted that when the apron is thus extended, the upper end of the gear shift lever 17 is freely accessible. The slot 25 in the apron body is of such a size while the sleeve 26 is of such length as to accommodate the necessary movements of the lever without disturbing the position of the apron so that the lever may be conveniently operated in the customary manner to control the vehicle without molesting the apron.

When the apron is not in use, the flaps 31 are, as shown in Figure 2, folded inwardly and the rings 30 engaged over the knobs 15 and 16. The apron will thus be supported by said rings in a position out of the way while, however, the middle portion of the apron will hang free to permit unrestrained movement of the gear shift lever 17. This desired bagging of the middle portion of the apron may, as will now be understood, be regulated by adjusting the rings 30 toward or away from the ends of the apron body in the openings 29.

In Figure 8 of the drawings I have shown a modified form of clip 32 which, if so desired, may be used in lieu of the clips 28. The clips 32 are separate from the apron body and are preferably formed of suitable resilient wire bent to provide spring jaws 33 adapted to engage over the flange 14 of the instrument panel 13 and under the forward margin of the apron body for securing the apron in operative position.

In Figure 9 I have shown a suspension device which, if so desired, may be utilized in lieu of the knobs 15 and 16 or may be utilized in connection with any vehicle not equipped with like knobs. This suspension device includes a flexible rubber suction cup 34 which is formed exteriorly with a stud 35 and engaged with said stud is a hook 36. Thus, the cups 34 may be readily attached in the well known manner to the instrument panel of a vehicle for supporting the hooks 36 in proper position to receive the rings 30 of the apron.

As will be appreciated upon reference to Figure 1 of the drawings, one or more of the windows of the vehicle may be lowered to afford ample ventilation within the vehicle without causing discomfort, due to the fact that the warm air will be retained by the apron about the legs and feet of the occupants of the vehicle. Thus, moisture or frost may be prevented from collecting on the vehicle windshield without chilling the occupants of the vehicle while also, the clearer vision provided will tend toward safer driving. Moreover, the apron will tend to encourage careful and moderate driving as the driver of the vehicle will be kept warm and comfortable.

Having thus described the invention, I claim:

A lap robe including an apron adapted to be secured at its forward margin to the instrument panel of a motor vehicle supporting the apron in active position to overlie the lap of the driver of the vehicle and at its rear end also provided with means for suspending the rear portion of the apron from said panel when in inactive position removed from the lap of the driver and a bight portion formed by said apron when in inactive position, and a flexible sleeve contained in said bight portion and attached to said apron around and enclosing an opening formed therein for receiving a vehicle operating lever for manipulation by the driver when the robe is in active or inactive position.

GEFFROD B. OLIVER.